(No Model.)
H. YORK & G. E. SLAUGHTER.
HAND TRUCK.
No. 560,457. Patented May 19, 1896.
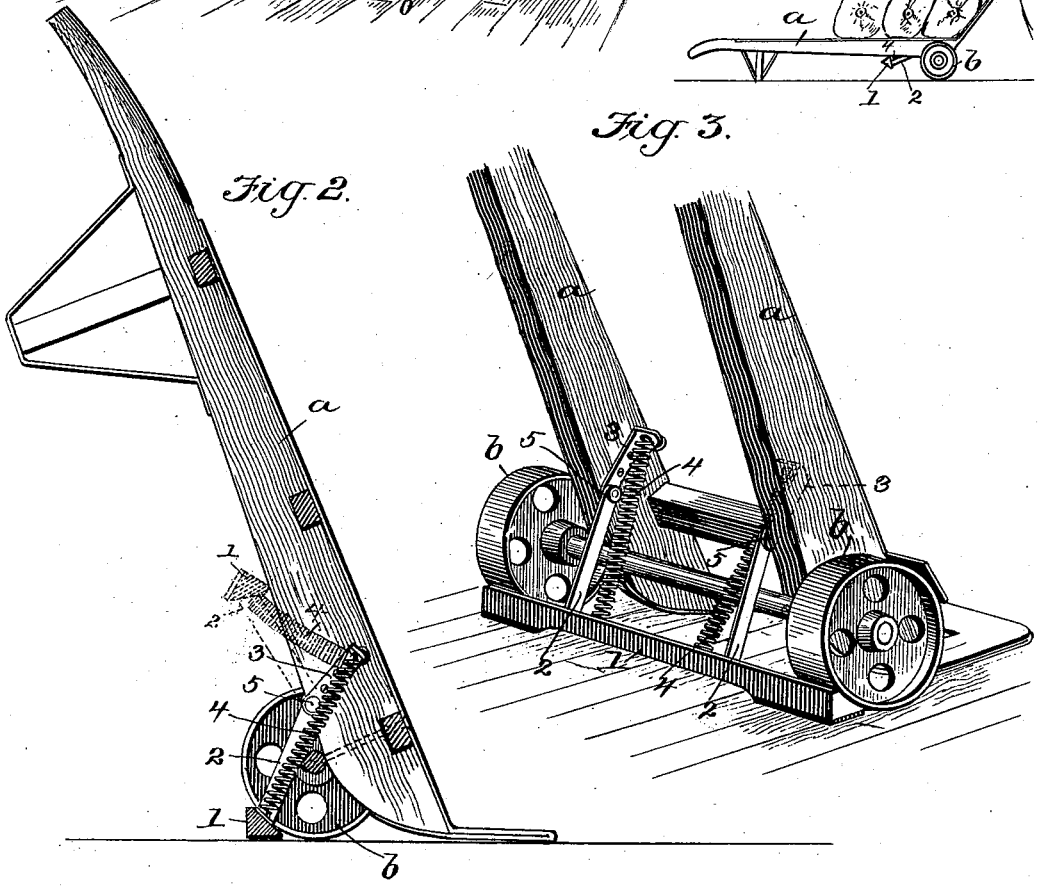
WITNESSES:
INVENTORS
Harry York
George E. Slaughter
BY
ATTORNEYS.

UNITED STATES PATENT OFFICE.

HARRY YORK AND GEORGE E. SLAUGHTER, OF COLTON, CALIFORNIA, ASSIGNORS OF ONE-THIRD TO JOHN FREDERICK BLANCHARD, OF SAN BERNARDINO, CALIFORNIA.

HAND-TRUCK.

SPECIFICATION forming part of Letters Patent No. 560,457, dated May 19, 1896.

Application filed November 21, 1895. Serial No. 569,667. (No model.)

*To all whom it may concern:*

Be it known that we, HARRY YORK and GEORGE E. SLAUGHTER, of Colton, in the county of San Bernardino and State of California, have invented a new and Improved Hand-Truck, of which the following is a specification.

Our invention consists in an improved means for chocking or braking a hand-truck for the purpose of preventing its forward or backward movement while being loaded.

The construction, arrangement, and operation of parts are as hereinafter set forth.

Figure 1 is a perspective view illustrating the practical use of a hand-truck provided with our invention. Fig. 2 is a side view illustrating the operation of depressing the chock or brake bar. Fig. 3 is a view of the main portion of the under side of the hand-truck.

The truck proper is composed of a frame $a$ and wheels $b$, constructed and arranged in the usual manner. The chock or brake 1 is formed of a wooden bar, and the means for attaching it to the body $a$ of the truck are the jointed metal bars 2 and 3, while the helical spring 4 serves for holding it in normal raised position, as shown by dotted lines, Fig. 2. The brake-bar 1 has a flat side to adapt it to rest or lie flat on the floor, as shown. The parallel bars 2 are rigidly attached to the chock or brake bar 1, and their upper ends are jointed at 5 to the parallel arms of bar 3. The latter extends transversely between the sides of the truck-frame $a$, and its parallel end portions or arms are screwed to said frame. The spring 4 is pendent from the middle portion of such bar 3 and connected at its lower end with the brake-bar 1. The length of said spring is such that it will hold the brake-bar 1 supported against or in contact with the under side of the truck-frame $a$, as shown by full lines, Fig. 1, but is stretched and under tension when the brake-bar is in either of the two positions shown by full lines in the several figures. The position of the brake-bar 1 shown in dotted lines, Fig. 1, is the normal one. When required for use, the truck proper is raised, and the operator presses the brake-bar 1 (see Fig. 2) down upon the floor and against the rear side of wheels $b$, which position (shown in Figs. 2 and 3) it tends to retain, owing to the fact that the joint 5 of bars 2 and 3 is located slightly out of alinement with the brake-bar 1 and bar 3. In other words, the pivoted bars 2 stand in such case inclined to or at an angle in rear of the spring 4, which therefore tends to hold the brake-bar against the rear side of the wheels $b$.

It will be seen that the flat sides of the brake-bar 1 enable it to present a comparatively broad surface to the wheels and the floor, so that its friction therewith is correspondingly greater, and the truck therefore more securely braked or chocked. To increase the friction or hold of the brake-bar on the floor, we provide it with elastic cushions or blocks, which are secured to one of its flat sides. It is further apparent that when the truck has been loaded and its handle depressed by the operator, so that the truck is in horizontal position, the brake-bar 1 will be automatically raised to its normal position, as shown by dotted lines, Figs. 1 and 2, by springs 4, and held in that position until again required for use.

What we claim is—

1. The combination, with the hand-truck proper of the transverse swinging brake-bar, the bar, 3, having parallel arms secured to the frame of said truck, the arms, 2, jointed to said arms, and attached to said brake-bar, and a helical spring which connects the latter with said bar, 3, the joints or pivots of the bar 2 being in rear of and thus out of alinement, when the spring is extended or under tension, with the brake-bar and bar 3, as shown and described.

2. The combination, with the hand-truck proper, of the pivoted, swinging chock, or brake bar, having flat outer sides, pivoted arms, 2, carrying the same, and having such length and their pivots being so located that the brake-bar may engage or lock with the wheels on the rear side, and a spring connected with the brake-bar and the truck, as shown and described, whereby, when under tension it lies out of alinement with the brake-bar and the joints or pivots of the bars carrying it, as shown and described.

HARRY YORK.
GEO. E. SLAUGHTER.

Witnesses:
GEO. E. BURRAY,
F. R. BRIGHT.